United States Patent [19]
Ruffner et al.

[11] 3,936,946
[45] Feb. 10, 1976

[54] GEAR TESTER FOR PITCH MEASURING

[75] Inventors: Heinz E. Ruffner, Langnau; Meinrad Donner, Nuolen, both of Switzerland

[73] Assignee: Maag Gear-Wheel & Machine Co., Ltd, Switzerland

[22] Filed: Sept. 13, 1974

[21] Appl. No.: 505,910

[30] Foreign Application Priority Data
Sept. 14, 1973 Switzerland.................... 13254/73

[52] U.S. Cl............................ 33/179.5 R; 33/174 P
[51] Int. Cl.²........................................... G01B 7/28
[58] Field of Search....... 33/179.5 R, 174 P, 147 M, 33/169 R

[56] References Cited
UNITED STATES PATENTS
2,913,831 11/1959 Höfler............................ 33/179.5 R
3,122,839 3/1964 Muller............................ 33/179.5 R

*Primary Examiner*—Richard E. Aegerter
*Assistant Examiner*—Willis Little
*Attorney, Agent, or Firm*—Toren, McGeady and Stanger

[57] ABSTRACT

A gear testing apparatus has a probe or feeler biassed into engagement with a gear tooth flank for measurement of the flank. To lift the feeler from the tooth flank and/or to displace it to a further setting in which it can be used to measure an oppositely facing flank a mechanism is provided that requires only a momentary power input to effect the lifting or displacement. The apparatus is arranged to retain the feeler in its new setting when lifting or displacement has occurred and after said power input has been discontinued.

7 Claims, 3 Drawing Figures

GEAR TESTER FOR PITCH MEASURING

BACKGROUND OF THE INVENTION

The invention relates to feeler or tracer apparatus for the testing of gear forms and is concerned with the provision of means for lifting a probe or feeler from a gear tooth flank under measurement and/or changing over the setting of the probe or feeler for respective measurements on left-hand and right-hand tooth flanks.

In a known gear testing apparatus, the probe or feeler can be lifted from a tooth flank by means of an electromagnet which is continuously on after the lifting operation and during the measurement process. Due to the long period for which the electromagnet is switched on, a heating effect occurs which has an effect on the measurement. In addition, with this known apparatus a change-over from the pitch measurement of left-hand tooth flanks to that of right-hand tooth flanks has to be effected manually by another arrangement of the separate feelers.

One object of the invention is to limit a minimum the heating of the apparatus by the mechanism for said adjustments of the probe or feeler in order to avoid any influence on the results of measurements. Another object of the invention is to eliminate the necessity for manual adjustment when changing over from the measurement of one tooth flank to an oppositely facing flank.

SUMMARY OF THE INVENTION

This is achieved according to the invention by providing a power transmitter that is operative only intermittently on the probe or feeler and simply for the lifting of the probe or feeler and/or for its change-over from one flank to an oppositely facing flank.

BRIEF DESCRIPTION OF THE DRAWINGS

The invention will be more particularly described by way of example with reference to the accompanying diagrammatic drawings, wherein.

DETAILED DESCRIPTION OF THE PREFERRED EMBODIMENTS

Figure 1:
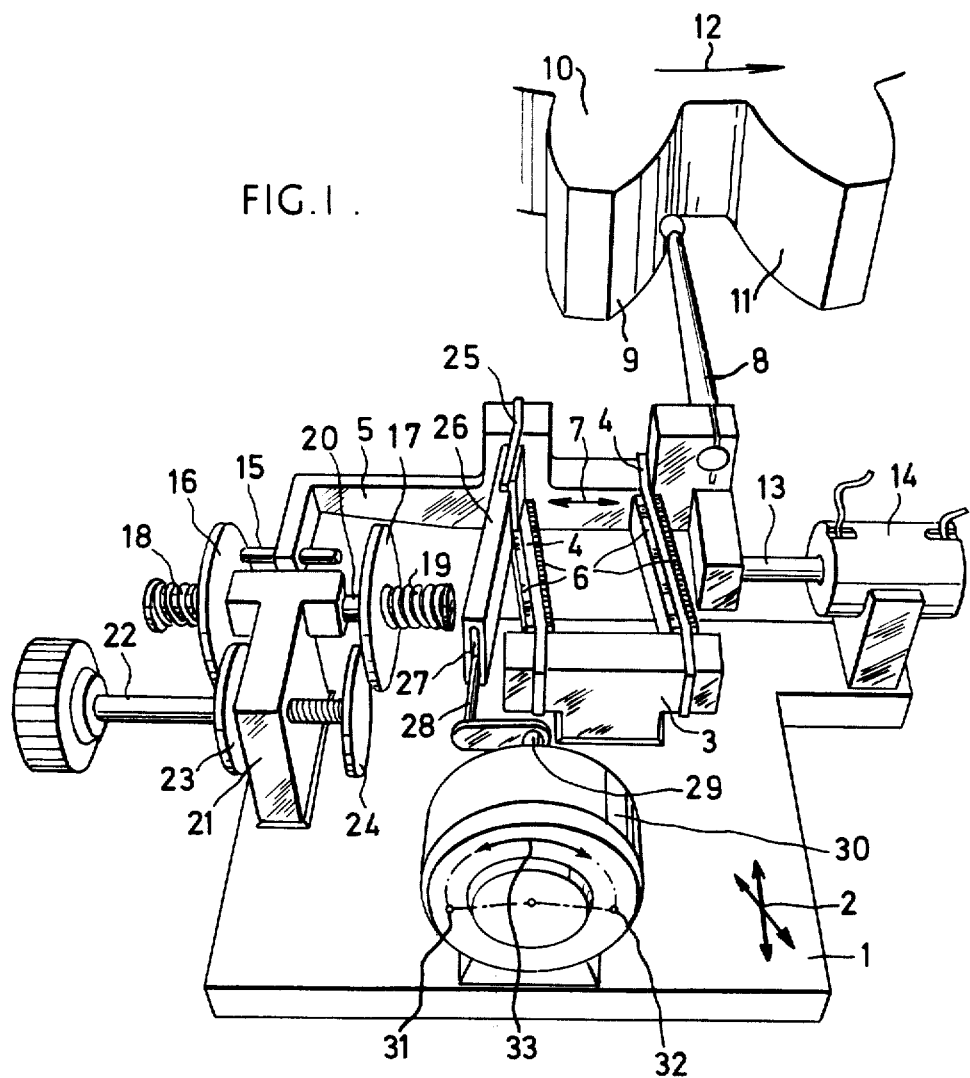
FIG. 1 is a perspective view of one form of feeler apparatus according to the invention.
Figure 3:
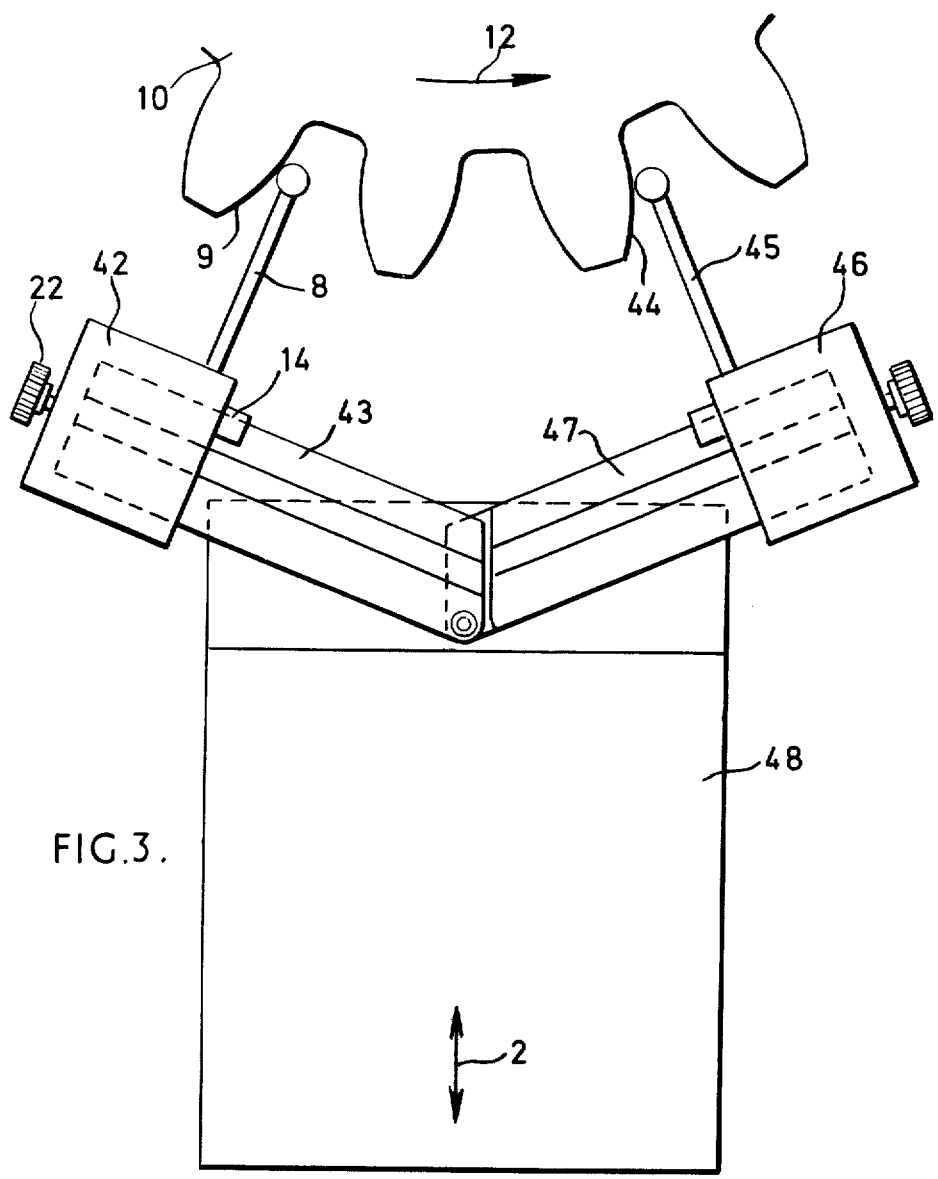
FIG. 3 is a plan view of a feeler arrangement incorporating the apparatus of FIG. 1 or FIG. 2 and having a pair of spaced probes or feelers for gear pitch measurements.

Referring to FIG. 1 of the drawings, this shows a base plate 1 which is guided by means (not shown) for reciprocatory movement in the direction of arrows 2 on a gear production or testing machine. Said machine can be of known design and as its form is not part of the subject matter of the present invention, it is not illustrated, although further details of one manner of mounting the base plate are shown in FIG. 3 and will be further described below with reference thereto.

Fixed on the base plate 1 is a pedestal 3 to which two parallel leaf springs 4 are secured by their rear ends, while a support 5 is fixed to the other end of the two springs. In their intermediate zones between the two ends the springs 4 are provided with stiffening means 6. The support 5 is thus mounted to be movable in the direction of the arrow 7, the leaf springs 4 acting as guides in a parallel motion linkage.

Fixed in the support 5 to project forwardly therefrom is a probe or stylus 8, which is shown in contact with a flank 9 of a gear 10 mounted in the gear production or testing machine for rotation as indicated by the arrow 12. In the tooth space in which the probe is shown, reference 11 designates the tooth flank opposite the flank 9. The support 5 also has arranged thereon a measuring pin 13, which is a part of an induction sensing arrangement responsive to the position of the probe 8 in the direction 7, the associated electric or electronic measuring elements of said arrangement being arranged in a housing 14, fixed on the base plate 1. Such induction sensing arrangements are known in the art of measurement and require no further illustration or explanation here.

Also fixed on the support 5 is a stop pin 15, which limits the movement of the support 5 in the direction of the arrows 7. For this purpose the pin 15 co-operates with stop discs 16 and 17, which are held on a bolt 20 secured in a support 21 fixed to the base plate. The discs 16, 17 are urged towards each other by springs 18 and 19 but this movement of the discs 16, 17 is limited by stop discs 23 and 24 mounted on a screw member 22 threadedly engaged by the support 21. The member 22 is thus adjustable to vary the positions of the stop discs 23, 24, so varying the biassed end positions of the discs 16, 17 and thereby determining the end positions of the support 5 and the probe 8 in the direction of the arrows 7.

The support 5 also has fixed thereon a leaf spring 25, on which is secured a rigid extension 26 formed with an opening 27. Engaging in this opening is an eccentric pin 28 of a rotor arm 29, forming part of a motor 30 which is mounted on the base plate 1. The rotor arm 29 has a pivoting movement, as indicated by the arrow 33, between angular end settings 31 and 32. The settings 31 and 32 are inclined somewhat below the horizontal through the axis of rotation of the rotor arm, i.e. the arm can be rotated through more than 180°, but less than 360°. Due to the resilient deflection of the leaf spring 25 at the end positions, there is therefore a transverse pressure of the extension 26 on the eccentric pin 28 that provides a force component urging the rotor arm downwards and thereby locking the arm in the end position it has reached, even with the motor 39 switched off.

In operation, with a helical or spur gear to be tested rotated to a first position, the probe 8 is brought into contact with one tooth flank, as shown, when the base plate 1 is moved to a forward, measuring position. The position of the probe is sensed by the measuring pin 13 and can be indicated and/or recorded by conventional instrumentation. If required, the probe can trace a measurement path over the tooth flank by movement of the base plate, possibly in conjunction with rotation of the gear. When measurement of the flank has been completed, the probe is disengaged from it by displacing the base plate to its rearward position in the direction 2 and after rotary indexing of the gear the next tooth space is located before the probe for the base plate to be moved forwards again and the next measurement made in a similar manner.

The procedure serves for measuring one flank of each tooth — e.g. in the position of adjustment of the apparatus shown in FIG. 1, the apparatus is set for measuring the left-hand flank 9 of each tooth. If the apparatus is now to be used for making a measurement on the right-hand flank 11, the motor 30 is briefly switched on, whereupon the rotor arm 29 swings the eccentric pin 28 from the angular position 31 into the position 32. Consequently, the extension 26, through the leaf spring 25, urges the support 5 from a leftwardly biassed position to a rightwardly biassed position on the parallel motion linkage provided by the springs 4. The end position of the support 5 is given by the stop pin 15 and the stop disc 17, and will require to be reset by the screw member 22 according to the module of the gear to be tested. After this changeover for the testing of the right-hand tooth flanks, the measurement of the flanks proceeds in just the same way as with the left-hand tooth flanks. The mechanism comprising the motor 30 for adusting the position of the support 5 can be used alternatively or additionally for the purpose of lifting the probe from a tooth flank in essentially the same way.

Figure 2:
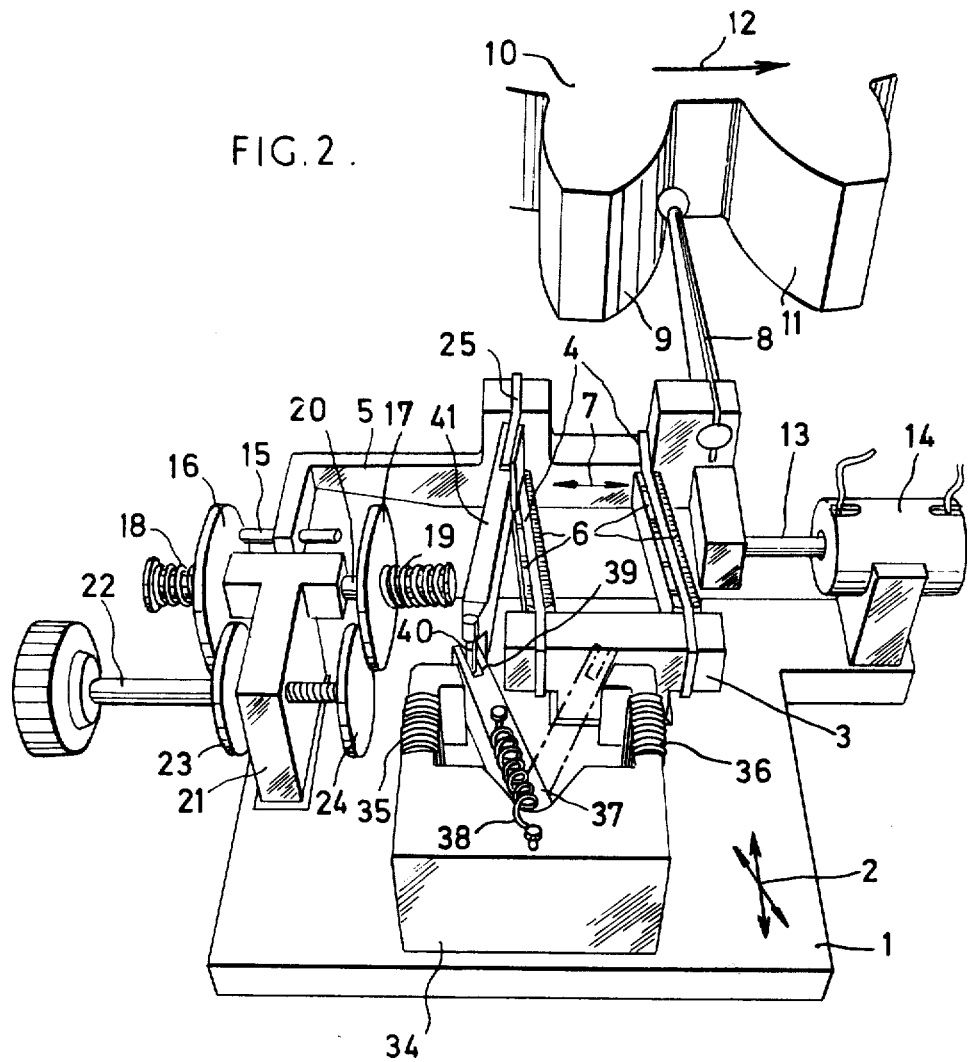
FIG. 2 is a perspective view of a second form of feeler apparatus according to the invention, similar in many respects to that in FIG. 1 but having a different lifting and changeover mechanism.

A modification of FIG. 1 can be seen in FIG. 2, where parts corresponding to those already described are indicated by the same reference numbers. In this embodiment, however, an electromagnet 34 is mounted on the base plate 1 instead of the motor 30. Magnet coils 35 and 36 can be energised to pull a lever 37 pivotally mounted in the magnet 34 towards one or other side. In each of its opposite end positions the lever is urged rearwards by a spring 38 and is thus held in either end position when the electromagnet is without current. A slot 39 in the lever 37 engages a pin 40 of an extension 41 which is connected to the leaf spring 25 and the displacement of the lever by momentary operation of the electromagnet changes the position of the support 5 to the same effect as the arrangement in FIG. 1. The lateral pressure on the lever 37 from the pin 40 is resisted by the force of the spring 38 in both end positions of the lever.

FIG. 3 shows an arrangement of feelers for pitch testing by measuring the spacing of two similarly directed flanks 9, 44 of a spur or helical gear 10. The arrangement comprises two feeler units 42, 46 of which the left-hand unit 42 is precisely of the form illustrated in FIG. 1 or FIG. 2 and is indicated with the probe 8. The right-hand unit 46 is simply an opposite-handed form of the unit 42 and does not therefore require any further description or illustration. Its probe is indicated by the reference number 45.

Each unit 42, 46 is displaceably secured on a respective cross-slide 43, 47 to be movable towards and away from each other. The cross-slides 43, 47 are pivotally securable on a main slide 48 movable forwards and backwards in the direction of the arrows 2 and thus providing the previously described reciprocating movements of the base plate 2 of each unit. The settings of the units 42, 46 along their cross-slides 43, 47 and the angular positions of the cross-slides on the main slide 48 are dependent on the number of teeth on the gear to be tested and the tooth spacing. As will be clear from this figure, the mutually oblique arrows 2 drawn in FIGS. 1 and 2 indicate different positions of angular adjustment of the cross-slides on the main slide.

The manner of adjusting the settings of the probes for measurement of the opposite tooth flanks is of course as already described. It will be appreciated that the motors 30 or the electromagnets 34 of the respective units can be actuated simultaneously by a common input.

It is a feature of the constructions described that there will be virtually no heating effect on a feeler unit from the brief switching on of the motor 30 or the electromagnet 34. The test measurements are thus unaffected by thermal effects from this source.

What we claim and desire to secure by Letters Patent is:

1. Feeler apparatus for gear testing comprising, in combination, a support, carrier means mounted on said support, a probe element held by said carrier means for engagement with a tooth flank of a gear to be tested, displacement means for adjusting the position of the element on the support between at least two alternative positions, said carrier means permitting movement of said element relative to the support in each of said positions, said displacement means comprising a motive power device for effecting the adjustment of said element between the alternative positions, and biassing means acting on said element to retain it in either position after each adjustment whereby the motive power device is operative only for the displacement of the element to each alternative setting.

2. Feeler apparatus for gear testing comprising, in combination, a support, a probe element mounted on said support for engagement with a first tooth flank of a gear to be tested, displacement means operable upon said element for adjustment of the element position to displace said element laterally away from said first tooth flank until it is caused to engage a second tooth flank of the tooth space bounded by both said flanks and location means for urging the element to either of two mutually remote positions in dependence upon the direction of adjustment of the element, the location means retaining said element in a respective position after operation of the displacement means to move it toward said position, whereby said displacement means are operative only during the adjusting displacement of said element.

3. Apparatus according to claim 2 wherein said retaining means bias the probe element towards engagement with a tooth flank and said displacement means comprise a rotatable member that swings through an angle greater than 180° and less than 360°, said member acting against the biassing means in an intermediate part of said swinging movement to adjust the element position against the biassing means force and said biasing means acting on the member in opposite end positions of said swinging movement to retain the member in said end positions.

4. Apparatus according to claim 2 wherein said displacement means comprise electromagnet means operatively associated with said element to effect said adjustment of element position by pulse operation.

5. Apparatus according to claim 4 further comprising a lever displaceable by said pulse operation of the electromagnet means, said lever being connected to the probe element thereby to effect said adjustment of element position, said retaining means comprising a resilient member acting on the lever to retain it in alternative end positions of adjustment corresponding to said adjustment of element position.

6. Feeler apparatus for gear testing comprising, in combination,
 a. a support,
 b. a probe element for engagement with a tooth flank of a gear to be tested, c. means mounting said element on said support in an adjustably displaceable manner,
d. displacement means operable to displace the element for adjustment of the element position, whereby said element is caused to either of engage the respective laterally opposite tooth flanks bounding a tooth space of said gear to be tested,
e. drive means for said operation of the displacement means, and
f. biasing means acting between the support and the element for urging the element laterally towards the respective tooth flank determined by the position of the element by said displacement means, whereby the drive means of said displacement means are operative to effect the adjusting displacement of the element only between the respective positions and the element is retained in each position by said biasing means after said operation of the drive means.

7. Apparatus according to claim 2, wherein a resilient link between the displacement means and the probe element urges the element towards the respective tooth flank of the alternative element settings.

* * * * *